(12) United States Patent
Heren et al.

(10) Patent No.: US 8,244,446 B2
(45) Date of Patent: Aug. 14, 2012

(54) HYDRAULIC ENERGY RECOVERY SYSTEM

(75) Inventors: Jean Heren, Margny lès Compiegne (FR); Gilles Lemaire, Margny lès Compiegne (FR); Julien Viard, Pontpoint (FR)

(73) Assignee: Poclain Hydraulics Industrie, Verberie (FR)

( * ) Notice: Subject to any disclaimer, the term of this patent is extended or adjusted under 35 U.S.C. 154(b) by 706 days.

(21) Appl. No.: 12/307,159

(22) PCT Filed: Jul. 2, 2007

(86) PCT No.: PCT/FR2007/051573
§ 371 (c)(1),
(2), (4) Date: Dec. 31, 2008

(87) PCT Pub. No.: WO2008/003895
PCT Pub. Date: Jan. 10, 2008

(65) Prior Publication Data
US 2009/0259378 A1    Oct. 15, 2009

(30) Foreign Application Priority Data
Jul. 3, 2006 (FR) ...................................... 06 52763

(51) Int. Cl.
*G06F 19/00* (2006.01)
*G06G 7/70* (2006.01)
(52) U.S. Cl. ........................................................ 701/99
(58) Field of Classification Search ................... 701/99; 60/413
See application file for complete search history.

(56) References Cited

U.S. PATENT DOCUMENTS

| | | | | |
|---|---|---|---|---|
| 4,592,454 A | * | 6/1986 | Michel | 192/3.23 |
| 2003/0140626 A1 | * | 7/2003 | Schenk et al. | 60/422 |
| 2005/0178115 A1 | * | 8/2005 | Hughey | 60/413 |
| 2006/0254555 A1 | * | 11/2006 | Berger et al. | 123/192.1 |
| 2007/0033933 A1 | * | 2/2007 | Bitter | 60/413 |
| 2007/0182245 A1 | * | 8/2007 | DuCharme | 303/152 |

FOREIGN PATENT DOCUMENTS

| | | |
|---|---|---|
| EP | 1 589 264 A2 | 10/2005 |
| GB | 1 214 511 A | 12/1970 |
| GB | 2 065 836 A | 7/1981 |

OTHER PUBLICATIONS

International Search Report: PCT/FR2007/051573.

* cited by examiner

*Primary Examiner* — Mary Cheung
*Assistant Examiner* — Michael D Lang
(74) *Attorney, Agent, or Firm* — Ladas & Parry LLP

(57) ABSTRACT

A hydraulic valve having firstly a feed port, a low-pressure link port, and a high-pressure link port, which ports are respectively connected to the feed and discharge ducts of a hydraulic motor, to a low-pressure fluid source, and to a high-pressure accumulator, and secondly an auxiliary port. The valve has a slide that can take up a neutral position for connecting together the feed, discharge, and auxiliary ports, an energy recovery position for connecting together respectively the feed and low-pressure ports, and the discharge and high pressure ports, and an energy delivery position for connecting together respectively the feed and high-pressure ports, and the discharge and low-pressure ports. The slide is caused to move from its neutral position to its other positions by control signals and the auxiliary port can be connected to a reservoir or to a clutch fluid source for clutching or declutching the motor.

18 Claims, 9 Drawing Sheets

HYDRAULIC ENERGY RECOVERY SYSTEM

BACKGROUND OF THE INVENTION

The present invention relates to a hydraulic circuit for recovering energy, which circuit comprises at least one hydraulic motor, two main ducts for feeding fluid to or discharging fluid from said at least one motor, a low-pressure fluid source, a high-pressure accumulator forming a high-pressure fluid source, and valve means suitable for taking up an energy recovery configuration in which said valve means respectively connect the feed main duct to the low-pressure fluid source and connect the discharge main duct to the high-pressure accumulator, and an energy delivery configuration in which said valve means respectively connect the feed main duct to the high-pressure accumulator and connect the discharge main duct to the low-pressure fluid source.

It is known that such circuits can be fitted to vehicles for the purpose of limiting energy consumption. Such vehicles are "hybrid" vehicles, each such vehicle having a conventional propulsion engine (e.g. of the internal combustion engine type) and a circuit of the above-mentioned type in which the hydraulic motor(s) can be coupled mechanically to the propulsion device, e.g. by being coupled to the drive outlet of said device, or indeed to a wheel of the vehicle. At cruising speed, the vehicle is normally driven by its conventional propulsion engine. Energy recovery takes place during braking, during which the hydraulic motor is driven by the propulsion of the vehicle that is being braked, so that said hydraulic motor operates as a pump and feeds the high-pressure accumulator with fluid. Energy delivery takes place in particular during an acceleration phase, during which the vehicle is accelerating and during which the hydraulic motor is activated once again and is fed with high-pressure fluid coming from the accumulator, so as to deliver drive torque for assisting propulsion of the vehicle.

Such "hybrid" systems are known to be advantageous in reducing fuel consumption.

In order for the system to be genuinely effective, it is necessary for the hydraulic motor not to generate any significant resistive torque when it is deactivated, and for it to be simple and quick to put the motor into the various configurations using control means that are compact and inexpensive.

An object of the present invention is to improve the state of the art in order to achieve the above-mentioned objectives.

This object is achieved by the fact that the hydraulic motor is suitable for being declutched or for being clutched by fluid pressure, by the fact that the valve means comprise a hydraulic valve comprising firstly a valve body having a feed port connected to the feed main duct, a discharge port connected to the discharge main duct, a low-pressure link port connected to the low-pressure fluid source, a high-pressure link port connected to the high-pressure accumulator, and an auxiliary port, and secondly a slide suitable for taking up, inside the body, a neutral position in which the feed port and the discharge port communicate with each other and with the auxiliary port, an energy recovery position in which the feed port is connected to the low-pressure link port while the discharge port is connected to the high-pressure link port, and an energy delivery position in which the feed port is connected to the high-pressure link port while the discharge port is connected to the low-pressure link port, and by the fact that the hydraulic circuit further comprises control and selection means suitable for causing the slide to move from its neutral position towards its energy recovery position on receiving a first control signal, for causing the slide to move from its neutral position towards its energy delivery position on receiving a second control signal, and for causing the auxiliary port to be connected to a pressure-free enclosure or to a clutch fluid source for clutching the hydraulic motor on receiving a selection signal.

The hydraulic motor has pistons, in particular extending radially relative to the axis of rotation of its rotor, which pistons co-operate with a cam to generate the drive torque. Clutching the motor consists in placing the pistons in contact with the cam, while declutching it consists in moving them away therefrom. It can be understood that, in the declutched state, the motor does not generate any resistive torque. In the same hydraulic valve, the valve means comprise a slide that is mounted to move in the valve body between positions corresponding to the energy recovery configuration and to the energy delivery configuration, and into a neutral position in which, depending on whether the auxiliary port is connected to the pressure-free enclosure or to the clutch fluid source, the motor can be declutched or clutched. The means making it possible to obtain these various positions are thus extremely compact and can be provided at reasonable cost. It is simple to perform the control for going between the various configurations because issuing control signals makes it possible to obtain the energy recovery or the energy delivery configurations, and the selection signal makes it possible to go between the motor clutched and the motor declutched configurations.

Advantageously, the neutral position of the slide is intermediate between the energy recovery position and the energy delivery position.

This makes it possible to go very rapidly back from the neutral position to one of the energy recovery and energy delivery positions.

Advantageously, the hydraulic valve has a first control chamber suitable for being fed with fluid via a first control port so as to urge the slide to move towards its energy recovery position, and a second control chamber suitable for being fed with fluid via a second control port so as to urge the slide to move towards its energy delivery position, and the circuit further comprises solenoid valve means suitable for connecting the two control ports to a pressure-free enclosure in the absence of a control signal, for connecting the first control port to a pilot fluid source on receiving the first control signal, and for connecting the second control port to the pilot fluid source on receiving the second control signal.

These control means for controlling the hydraulic valve are simple and reliable, and are of reasonable construction cost.

Advantageously, the solenoid valve means comprise a first pilot solenoid valve suitable, in the rest position, for connecting the first control port to the pressure-free enclosure and, in the activated position, for connecting said first port to the pilot fluid source, and a second pilot solenoid valve suitable, in the rest position, for connecting the second control port to the pressure-free enclosure and, in the activated position, for connecting said second port to the pilot fluid source.

The auxiliary port is advantageously one of the control ports.

Thus, the pilot fluid also serves as clutch fluid, thereby simplifying the circuit.

It is then advantageous for the solenoid valve means to be suitable for connecting both of the control ports to the pilot fluid source on jointly receiving first and second control signals issued together.

This joint reception makes it possible to obtain the neutral position and to obtain clutching of the motor, whereas said neutral position is obtained when the motor is in the declutched state while neither of the two signals is issued.

In a variant, the circuit advantageously further comprises a declutching solenoid valve suitable for taking up a declutching position in which it connects the auxiliary port to a pressure-free enclosure and a clutching position in which it connects the auxiliary port to the clutch fluid source.

In which case, the declutching is obtained by the specific declutching solenoid valve, which is controlled independently from the feeding of the control ports of the hydraulic valve.

Advantageously, the internal space(s) of the casing(s) of the hydraulic motor(s) is/are put under pressure, e.g. by being connected to the clutch fluid source via a constriction.

This putting under pressure makes it possible to go from the motor clutched state to the motor declutched state, because the pressure inside the casing tends to push back the pistons towards the end walls of their cylinders. As is known, other systems could be used to push back the pistons, e.g. springs.

The fact that the internal space of the casing is put under pressure from the clutch fluid source but via a constriction makes it possible to be certain of obtaining a pressure inside said internal space that is lower than the pressure used for performing the clutching, because of the head loss achieved by the constriction, and without however requiring the use of another fluid source.

The circuit of the invention, equipping a vehicle having a propulsion device to which said at least one hydraulic motor is suitable for being mechanically coupled, can be controlled by a method that comprises at least the following control steps:
  issuing a first control signal for performing an energy recovery phase during which said at least one hydraulic motor is clutched while the vehicle as driven by the propulsion device is decelerating;
  ceasing to issue the first control signal for performing a balancing phase during which the feed and discharge main ducts communicate with each other;
  issuing a second control signal for performing an energy delivery phase during which the hydraulic motor is clutched while the vehicle as driven jointly by the propulsion device and by said at least one hydraulic motor is accelerating; and
  ceasing to issue the second control signal for performing a standby phase during which the feed and discharge main ducts communicate with each other, and during which said at least one hydraulic motor is declutched.

While the vehicle is in a deceleration phase, the motor operates as a pump so that the feed main duct is at a pressure lower than the pressure at which the discharge main duct finds itself, which discharge main duct then feeds the high-pressure accumulator. Conversely, the pressure states are the reverse during an energy delivery phase, during which the feed duct is at a pressure higher than the pressure in the discharge duct. Performing a balancing phase between the energy recovery and energy delivery phases makes it possible to balance the pressures in the feed and discharge main ducts of the motor, thereby preventing the reversal of the above-mentioned pressure states from taking place too suddenly.

Advantageously, the balancing phase includes a first period during which said at least one hydraulic motor remains clutched, and, if it is established that said first period has ended, said first period is followed by a second period during which said at least one hydraulic motor is declutched, and at the end of which said at least one hydraulic motor is clutched again.

The fact that the motor remains clutched during the first period of the balancing phase makes it possible to go very rapidly to the energy delivery phase or to another energy recovery phase if necessary. Conversely, if, it is established that the first period has ended before it is necessary to go over to the energy delivery phase, declutching the hydraulic motor makes it possible to avoid unnecessarily overloading said hydraulic motor, and especially avoids generating drag torque giving rise to efficiency losses.

For example, the end of the first period is established by comparing the elapsed time of the balancing phase with a reference lapse of time, which can be a predetermined lapse of time, or else the deceleration lapse of time, or indeed a fraction thereof. It can also be established when a desired pressure for the charging of the high-pressure accumulator is reached.

Advantageously, in order to clutch said at least one hydraulic motor, the auxiliary port of the hydraulic valve is connected to the clutch fluid source, and the connection between the auxiliary port and the clutch fluid source is maintained during at least one of the energy recovery and energy delivery phases.

This makes it possible to ensure that the motor remains clutched, without requiring any particular control signal to be issued, at the end of the energy recovery and/or energy delivery phase during which the connection between the auxiliary port and the clutch fluid source has been maintained. It is thus possible, in particular, to avoid briefly going via declutching or a commencement of declutching after said phase, when the balancing phase starts.

BRIEF DESCRIPTION OF THE DRAWING FIGURES

The invention can be well understood and its advantages appear more clearly on reading the following detailed description of embodiments shown by way of non-limiting example. The description refers to the accompanying drawings in which.

DETAILED DESCRIPTION OF THE PREFERRED EMBODIMENTS

Figure 1A:
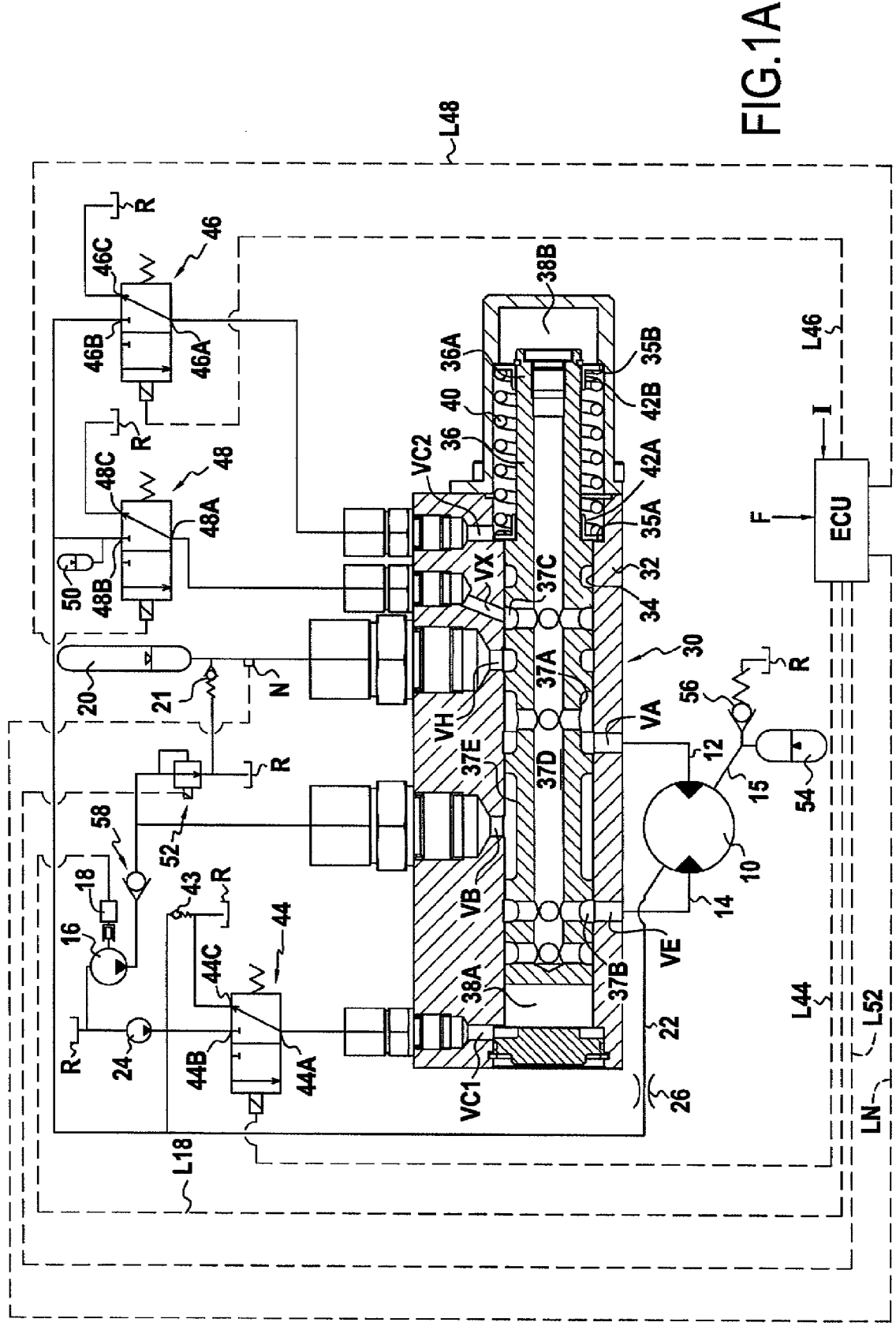
FIG. 1A shows a first embodiment of a hydraulic circuit of the invention, while the slide of the hydraulic valve is in its neutral position and while the hydraulic motor is declutched.

The circuit shown in FIGS. 1A to 1E includes a hydraulic motor 10 with two main ducts, respectively 12 and 14, for feeding fluid to said motor and for discharging fluid therefrom. It also includes a low-pressure fluid source 16 which, in this example, is formed by a high-flow-rate booster pump. Said pump is chosen to be suitable for delivering a flow rate of fluid that is sufficient to feed fluid to the hydraulic motor while said motor is at maximum speed, in the energy recovery configuration. If a plurality of motors are present in the circuit, the same high-flow-rate booster pump is advantageously used, which booster pump is dimensioned to deliver the flow rate of fluid that is sufficient to feed the various motors without cavitation when said motors are at maximum speed in this configuration.

Means are provided for activating or deactivating the pump 16. In this example, it is equipped with an electromagnetic clutch 18.

The circuit also includes a high-pressure fluid source, formed by an accumulator 20.

It is also possible to cause the circuit to operate by using a low-pressure accumulator of the type known per se as a low-pressure fluid source. However, using the above-mentioned pump 16 to form the low-pressure fluid source offers certain advantages, related in particular to the compactness of said pump relative to the space that would be required for a low-pressure accumulator that is capable of delivering a volume of fluid that is sufficiently large to charge the high-pressure accumulator appropriately.

The motor 10 is of the clutchable and declutchable type. For example, it is a hydraulic motor having radial pistons. In order to make it possible to go over to the declutched position, i.e. to urge the pistons of the motor back towards the end-walls of their cylinders, the internal space of the casing of the motor is put under pressure while the main ducts of the motor are connected to a pressure-free enclosure (reservoir), i.e. an enclosure having no extra pressure or having a pressure that is significantly lower than the pressure of the casing of the motor. For this purpose, a duct 22 connected to a pressure source opens out into the internal space of the casing. In this example, the pressure source used is a pump 24 which, as is explained below, is also the clutch fluid source, to which the internal space of the casing of the motor is connected via a constriction 26 disposed in the duct 22.

The circuit includes a hydraulic valve 30 that comprises a valve body 32 having an internal bore 34 inside which a slide 36 is slidably mounted.

The valve body 32 has a feed port VA connected to the feed main duct 12, a discharge port VE connected to the discharge main duct 14, a low-pressure link port VB connected to the low-pressure fluid source 16, a high-pressure link port VH connected to the high-pressure accumulator 20, and an auxiliary port VX that is connected to an auxiliary duct. The hydraulic valve 30 also comprises a first control chamber 38A connected to a first control port VC1 and a second control chamber 38B connected to a second control port VC2.

In FIG. 1A, the slide 36 is shown in its neutral position, into which it is urged back continuously by a spring 40, so that the slide takes up its neutral position when the fluid pressures in the control chambers 38A and 38B are equal or substantially equal. It can be seen that, in this example, the spring 40 is disposed around one end 36A of the slide, between two stop rings, respectively 42A and 42B that are fastened to the slide. The bore 34 of the valve body has two shoulders, respectively 35A and 35B, against which the stop rings 42A and 42B are suitable for coming respectively into abutment.

Figure 1B:
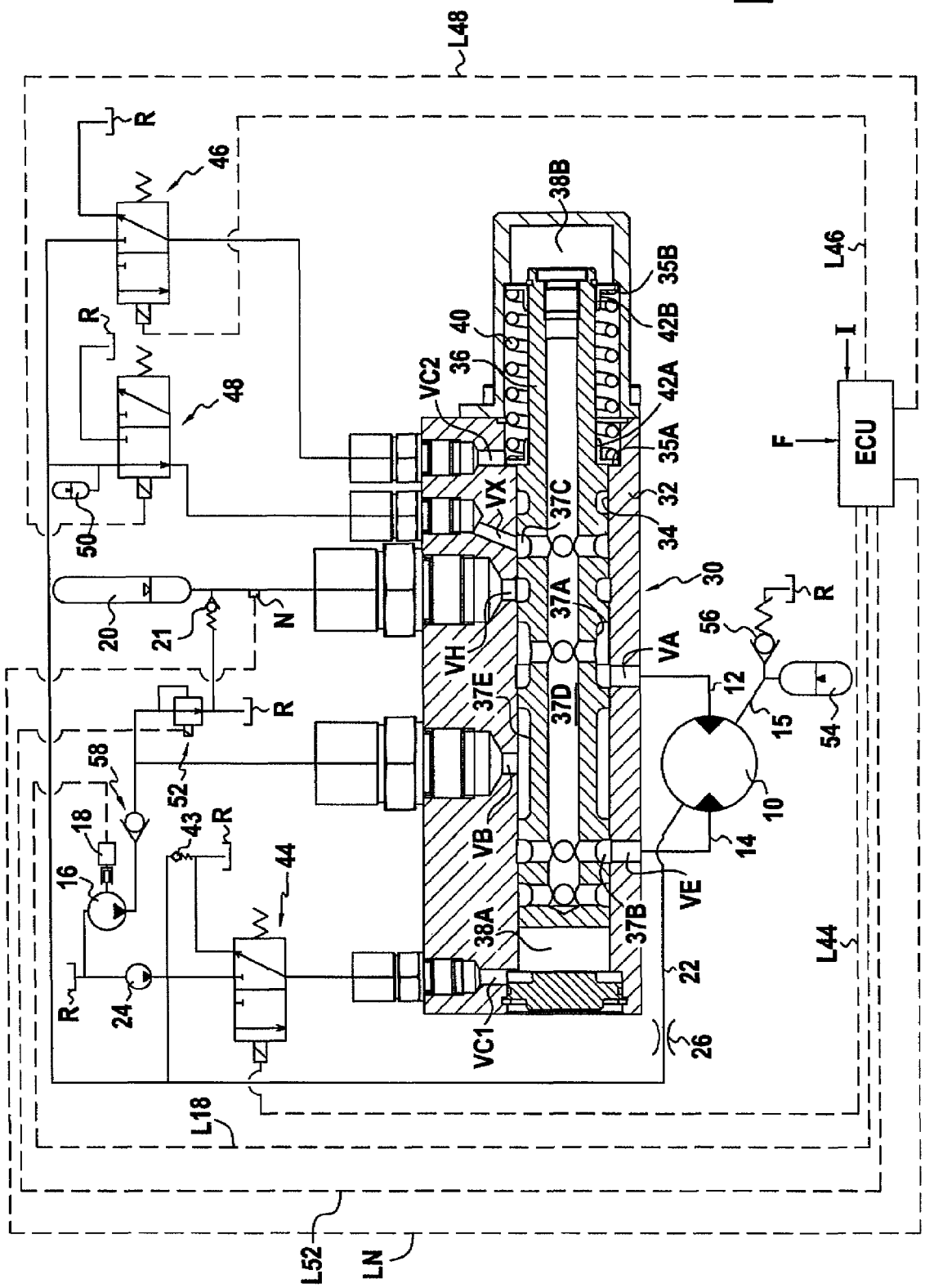
FIG. 1B shows the same circuit while the slide is still in the neutral position, but while the motor is clutched.
Figure 1C:
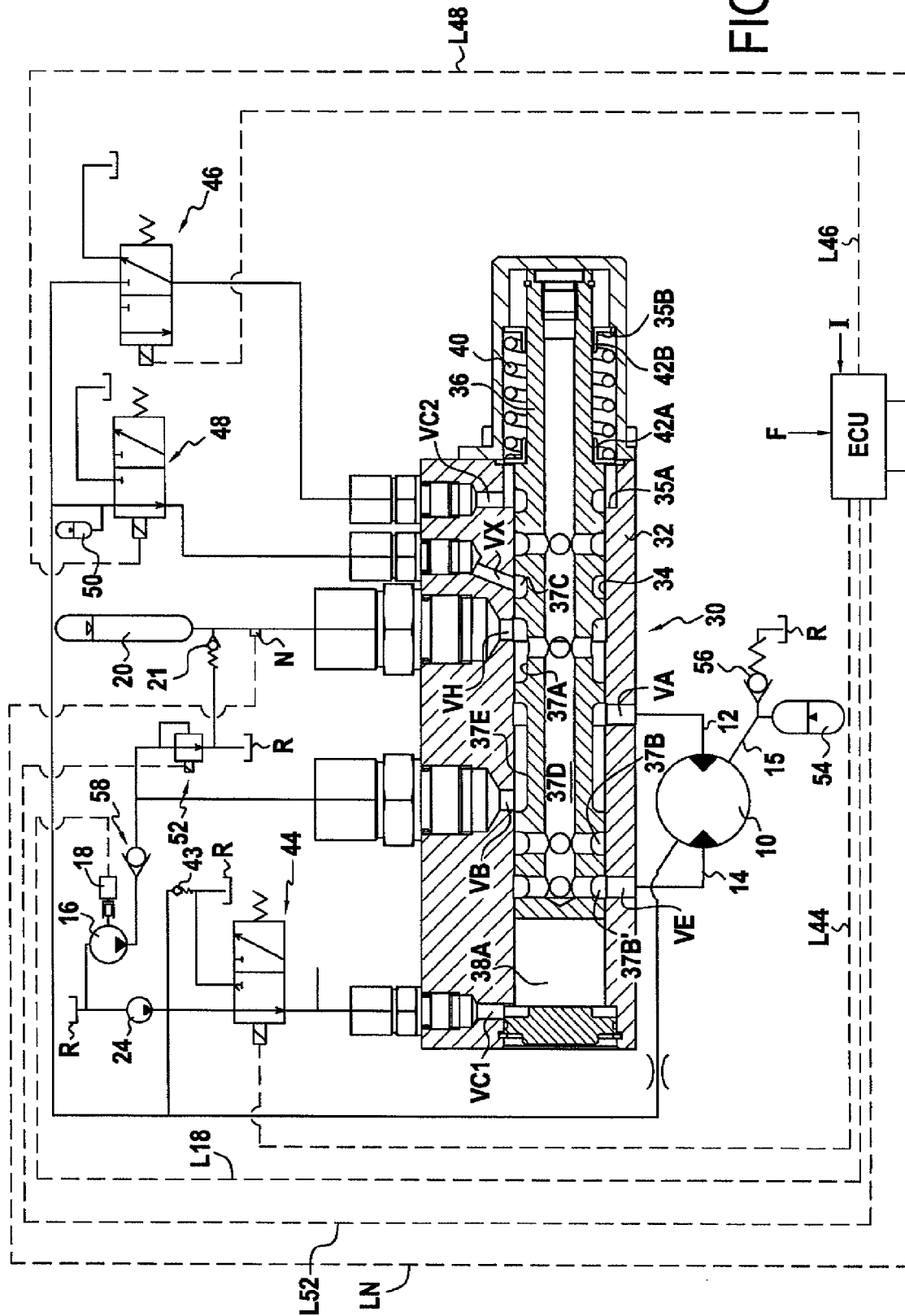
FIG. 1C shows this circuit during the energy recovery phase.
Figure 1D:
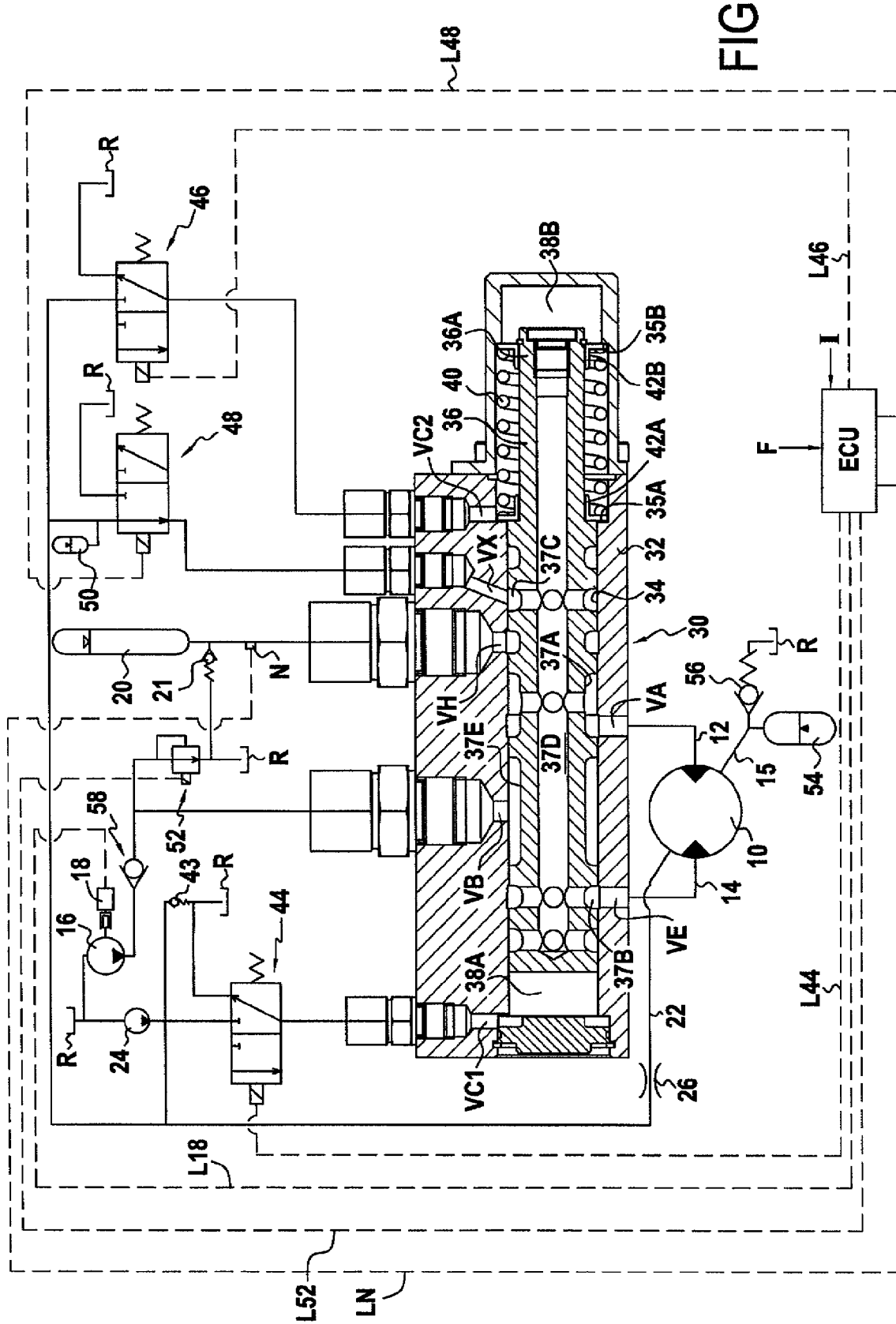
FIG. 1D shows this circuit at the end of the energy recovery phase, while the slide is back in its neutral position.

Thus, when the slide is in the neutral position, as shown in FIGS. 1A, 1B, and 1D, the rings 35A and 35B are in abutment against the two shoulders. In the energy recovery configuration, the stop ring 42A is remote from the shoulder 35A while the stop ring 42B co-operates with the shoulder 35B. The slide has been placed in a first end position (rightwards in this example) by increasing the pressure in the control chamber 38A, whose volume has increased.

Figure 1E:
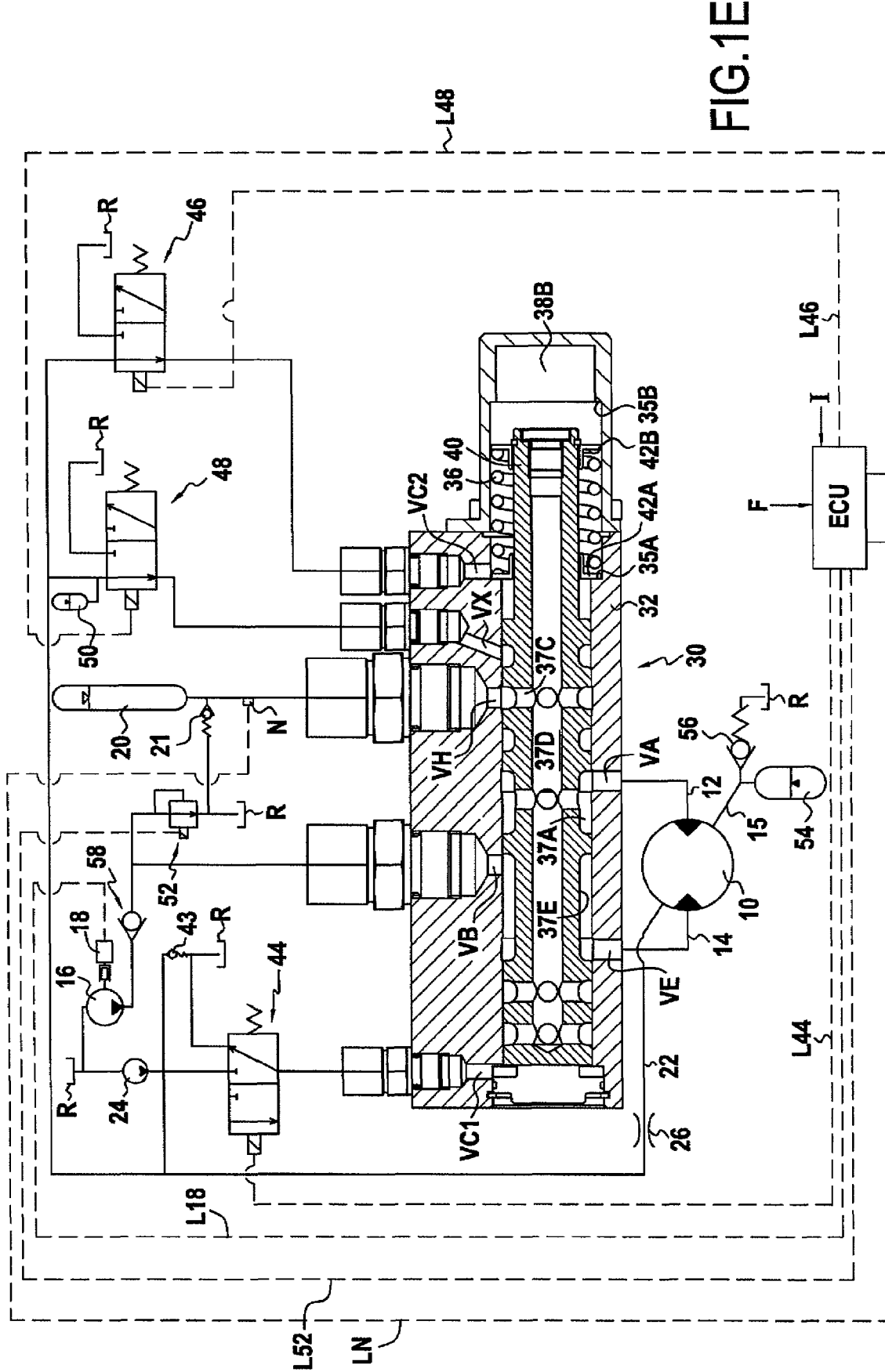
FIG. 1E shows this circuit during the energy delivery phase.

Conversely, in the energy delivery configuration shown in FIG. 1E, the ring 42A co-operates with the shoulder 35A, while the ring 42B is remote from the shoulder 35B. The slide has been moved into its other end position (leftwards in this example) by feeding fluid to the control chamber 38B, whose volume has increased.

Solenoid valve means cause the slide to be moved and the hydraulic motor to be clutched/declutched.

In this example, in a first embodiment of the invention, said solenoid valve means include a first pilot solenoid valve 44 having a first port 44A connected to the first control port VC1, a second port 44B connected to the pump 24, and a third port 44C connected to the reservoir R. When it is in its rest position shown in FIG. 1A, its ports 44A and 44C are interconnected, so that the first control chamber 38A is connected to the reservoir R, while the port 44B is isolated.

On receiving a first control signal issued into a line L44 by an electronic control unit ECU, the solenoid valve 44 goes into its activated position, in which the ports 44B and 44A are interconnected while the port 44C is isolated, so that the control chamber 38 is fed with the pressurized fluid coming from the pump 24. Thus, the slide goes into its first end position shown in FIG. 1C.

The solenoid valve means also include a second pilot solenoid valve 46 that has a first port 46A connected to the second control port VC2, a second port 46B connected to the pump 24, and a third port 46C connected to the reservoir R.

When the solenoid valve 46 is in the rest position shown in FIG. 1A, the ports 46A and 46C are interconnected, so that the second control chamber 38B is connected to the reservoir R. On receiving a second control signal issued into a control line L46 by the unit ECU, the valve 46 takes up its activated position in which the ports 46A and 46B are interconnected, so that the chamber 38B can be fed with fluid by the pump 24.

The circuit also includes a declutching solenoid valve 48 that has a first port 48A connected to the auxiliary port VX of the valve 30, a second port 48B connected to the pump 24, and a third port 48C connected to the reservoir R. When the valve 48 is in the declutching position which, in this example, is its rest position, the ports 48A and 48C are interconnected while being isolated from the port 48B, so that the auxiliary port VX of the valve 38 is connected to the reservoir. When the solenoid valve 48 is in the clutching position which, in this example, is its activated position into which it is caused to go by a control signal issued by the unit ECU into the control line L48, its ports 48A and 48B are interconnected, so that the auxiliary port VX of the valve 30 is connected to the pump 24.

Advantageously, in order to reduce the motor clutching time, a low-capacity (and therefore compact) accumulator 50 is disposed on a branch off the connection between the pump 24 and the ports 44B, 46B, and 48B of said valves.

It can be understood that, in the circuit shown, the pump 24 serves both to cause the slide 36 to move and so as to cause the motor 10 to be clutched/declutched. It is possible to provide two different pressure sources, one for operating the slide and one for clutching/declutching the motor. However, the solution shown offers the advantage of being more compact.

The pressure-free enclosure to which the various relief ports 44C, 46C, and 48C of the solenoid valves 44, 46, and 48 are connected is, in this example, the reservoir R.

Any excess pressure in the accumulator 20 can be relieved into the reservoir R, to which said accumulator is connected via a pressure limiter 21.

As indicated above, the high-flow-rate pump 16 is equipped with an electromagnetic clutch 18 that makes it possible to activate the pump only when necessary, in particular during an energy recovery phase. The clutch 18 is controlled by a control signal issued by the unit ECU into the control line L18. Therefore, the pump does not operate unnecessarily, which makes it possible to save energy.

Similarly, the circuit advantageously includes an adjustable pressure limiter 52 for varying the pressure in the low-pressure link port VB. It can be noted that a pressure limiter 52 is disposed on a link between the delivery orifice of the pump 16 and the reservoir R. This pressure limiter is of the adjustable type and the adjustment is, in this example, performed by electrical control, the limiter 52 being of the solenoid valve type and being connected to the control unit ECU via a control line L52. During the energy recovery phase, the low-pressure link port VB serves to feed the motor 10 and it is then desirable to adjust the pressure at the outlet of the pump 16 to a level necessary for feeding the motor without cavitation. Conversely, during the energy delivery phase, the link port VB, which is connected to the discharge of the motor, has to remove the fluid towards the pressure-free reservoir and it is then preferable for the pressure limiter 52 to be adjusted to a minimum pressure level, or even to zero pressure. Preferably, during said energy delivery phase, the pump 16 is deactivated and a check valve 58 prevents the fluid delivered by the motor 10 from returning towards the pump 16.

It is also noted that the internal space of the casing of the motor 10 is connected to a secondary accumulator 54. Said secondary accumulator 54 is connected to a leakage return duct 15 of the motor. It is thus recharged naturally with fluid by means of the leaks from the motor. However, in order to enable said leaks to be discharged to the reservoir R once the accumulator 54 is recharged, a pressure limiter 56 is disposed on the leakage return duct 15, downstream from the connection point at which the accumulator 54 is connected to said duct 15.

It can be seen that, in conventional manner, a pressure limiter 43 is connected to the delivery of the pump 24. It makes it possible to define the clutch and pilot pressure.

The circuit operates as follows.

When the circuit is in a standby configuration, shown in FIG. 1A, the slide 36 of the valve 30 is in its neutral position. In this situation, no control signal has been issued to the valves 44 and 46 that are in their respective rest positions, so that the control chambers 38A and 38B are not put under pressure and so that the neutral position is obtained by the return effect of the spring 40.

In this position, it can be seen that the feed port VA, the discharge port VE, and the auxiliary port VX communicate with one another. The slide 36 is provided with three grooves 37A, 37B, and 37C that are connected together via an axial hole 37D in the slide that is closed off at its two ends, and its grooves are in register with respective ones of the ports VA, VE, and VX. A fourth groove 37E of the slide, which groove is isolated from the preceding grooves, is then in register with the port VB, that it isolates from the other ports.

The electronic control unit ECU is informed of the conditions of operation of the vehicle, in particular of a deceleration or of an acceleration thereof, and thus of a need for energy recovery or for energy delivery, by an item of information I. When this information indicates a deceleration suitable for enabling energy to be recovered, the unit ECU issues a clutching signal into the line L48 and thus causes the solenoid valve 48 to go into its activated position, thereby enabling the auxiliary port VX to be fed with fluid. The feed and discharge main ducts 12 and 14 of the motor are then put at the same pressure (so that the motor does not yet generate any significant torque) but this pressure delivered by the pump 24 and possibly by the accumulator 50, is sufficiently higher than the pressure prevailing in the casing of the motor to push the pistons of the motor back against the cam thereof. The motor is then clutched. It should be noted that the above description refers to the situation when the rest position of the solenoid valve is the position in which it connects the port VX to the reservoir R. A reverse connection configuration can be imagined, in which, conversely, declutching is obtained when the solenoid valve is in the activated position and thus by a declutching signal being issued into the line 48, while clutching is obtained by causing said signal to cease so as to cause the solenoid valve 48 to return to its declutching position (which is then its rest position), connecting the port VX to the pump 24. In the general presentation of the invention, reference is thus made to a selection signal that, in order to cause the solenoid valve to go into its clutching configuration, can be positive control signal or, conversely, ceasing of the control signal that previously maintained the solenoid valve in its clutching position.

FIG. 1B shows the situation during clutching of the motor. It can be seen that the slide remains its neutral position, without modifying the interconnection between the ports VA, VE, and VX, or the isolation of the port VB, but that the solenoid valve 48 is in its clutching position.

In order to make the energy recovery phase possible that consists in feeding the accumulator 20 by the rotation of the motor 10 that is operating as a pump, it is necessary for the pump 16 to be activated by its clutch 18, in particular by a clutching control signal issued by the electronic control unit ECU.

With the motor being clutched, and the pump being activated, the electronic control unit ECU issues a first control signal into the line L44 for causing the solenoid valve 44 to go into its activated position, so as to cause the slide to move into its first end position by feeding the control chamber 38A.

This is the situation shown in FIG. 1C. It can be seen that the ports VA and VB of the valve 30 are then interconnected via the groove 37E of the slide 36 while being isolated from the other ports. The port VE is connected to the port VH via the groove 37'B of the slide, via its central hole 37D, and via the groove 37A. Functionally, the groove 37'B is analogous to the groove 37B, and it can be understood that these two adjacent grooves could be replaced with a single groove of the same type as the groove 37A. The port VX is isolated from the other ports.

The adjustment pressure limiter 52 is then set to its maximum pressure level. For example, the level is the level obtained by a control signal for controlling the pressure limiter 52 being issued into the line L52 by the unit ECU. In this situation, the motor 10 is driven in rotation by being mechanically coupled to the propulsion of the vehicle, and it operates as a pump by feeding the high-pressure accumulator 20 with fluid coming from the pump 16.

This energy recovery phase can continue throughout the deceleration or, if the unit ECU establishes that it is no longer necessary to continue to feed the accumulator 20, the energy recovery phase can terminate before the end of the deceleration. In order to establish that it is no longer necessary to continue to fill the accumulator 20, the unit ECU can, for example, receive a pressure level signal indicating the pressure level at the port VH, which signal is issued into a line LN by a pressure sensor N associated with the accumulator 20. Other types of information can indicate the end of the energy recovery phase, such as, for example, opening of the pressure limiter 21.

In any event, once the energy recovery phase is terminated, the control signal in the line L44 ceases, so that the solenoid valve 44 returns to its rest position, thereby connecting the first chamber 38A to the reservoir R. The slide 36 then returns to its neutral position, and the configuration shown in FIG. 1D is obtained, that configuration being analogous to the configuration shown in FIG. 1B except that the level of fluid in the accumulator 20 has increased.

The configuration of FIG. 1D corresponds to a balancing phase, during which the main ducts 12 and 14 of the motor communicate with each other. It is advantageous, at least during a first period of said balancing phase, for the motor to remain clutched, so as to go very rapidly into the energy delivery phase if necessary or so as to resume an energy recovery phase if braking resumes. That is why, in FIG. 1D, the solenoid valve 48 remains in its clutching position. However, provision is advantageously made for it to be possible for the motor to be declutched if, at the end of this first period, it is not yet necessary to go over to the energy delivery phase. For this purpose, it suffices for the clutching signal to cease, thereby enabling the solenoid valve 48 to go over to its configuration corresponding to declutching, in which configuration the auxiliary port VX is connected to the reservoir R.

The end of the first period can be established as a function of various parameters, as indicated in the introductory portion. To this end, the unit ECU can, for example, receive an end-of-first-period item of information F. It can be constituted by the duration of said first period that a computer of the unit ECU compares with a pre-recorded duration in a memory. It can also be a pressure level in the accumulator, compared with a reference level stored in the unit ECU, or indeed a comparison between the duration of the first period and the duration of the energy recovery phase, which duration is supplied to the unit ECU by an additional item of information.

If the end of the first period is established, the balancing phase includes a second period during which the motor is declutched by the solenoid valve 48 returning to its declutching position. In which case, it is only when the information I transmitted to the unit ECU indicates the need to begin an energy delivery phase that the motor is clutched again by the unit ECU issuing the selection signal causing the solenoid valve 48 to go into its clutching position.

When the motor is clutched, so as to go over to the energy delivery phase, it suffices for a second control signal to be issued into the line L46 in order to go over to the energy delivery phase. The circuit is then in the configuration shown in FIG. 1E, in which it can be seen that the solenoid valve 46 is in its activated position, thereby enabling the control chamber 38B to be fed with fluid, thereby moving the slide 36 into its second end position.

When the slide is in this position, the feed port VA and the high-pressure port VH of the valve 30 are interconnected via the groove 37A, via the hole 37D, and via the groove 37C of the slide 36, while being isolated from the other ports. The discharge port VE and the low-pressure port VB are interconnected via the groove 37E of the slide while being isolated from the other grooves, and the auxiliary port VX is isolated from the other grooves. During this energy delivery phase, the motor 10, fed by the high pressure coming from the accumulator 20, participates in delivering the drive for the vehicle. This makes it possible in particular to make energy savings when switching on the engine after it has been switched off, or when accelerating at low speed. The end of the energy delivery phase is established by the unit ECU, e.g. when the information I that is transmitted to it indicates that the vehicle has reached a sufficient speed or when the acceleration ceases. The energy delivery phase is also stopped when the accumulator 20 no longer has sufficient fluid pressure, in particular when the sensor N indicates a low pressure level in said accumulator.

During this acceleration phase, the pressure limiter 52 is set to a minimum, or even zero, pressure, this setting being obtained, for example, when the signal in the line L52 ceases.

It should also be noted that the pressure limiter 52 is advantageously set to the minimum pressure level as of the beginning of the balancing phase or, at least, as of the end of the first period of said balancing phase. During the acceleration phase, the pump 16 is deactivated, by a suitable control instruction or by absence of a control signal in the control line L18.

A description follows of FIGS. 2A to 2D, in which the elements that are unchanged relative to FIGS. 1A to 1E are designated by like references in the drawings.

In the valve 30, the second control port VC2 and the auxiliary port VX are distinct, whereas, in the valve 130, the same port VX' is both the auxiliary port and the second control port that feeds the control chamber 138B, although it could be the port that feeds the chamber 138A. By means of a hole 133 in the body 132 of the valve 130, its port VA opens out into its bore 134 at two distinct locations, respectively VA1 and VA2, spaced apart from each other in the direction in which the slide moves. Said slide has three transverse holes 137A, 137B, and 137C that are connected together via a blind hole 137D that opens out into the chamber 138B. This hole opens out into the chamber to which the auxiliary port VX' is connected and, if said auxiliary port were connected to the chamber 138A, the hole would be closed beside the chamber 138B and open beside the chamber 138A.

The first ports 44A and 46A of the valves 44 and 46 are connected to respective ones of the control chambers 138A and 138B which, in the drawings, are situated respectively at the right end and at the left end of the bore 134 of the body 132 of the valve 130.

Figure 2A:
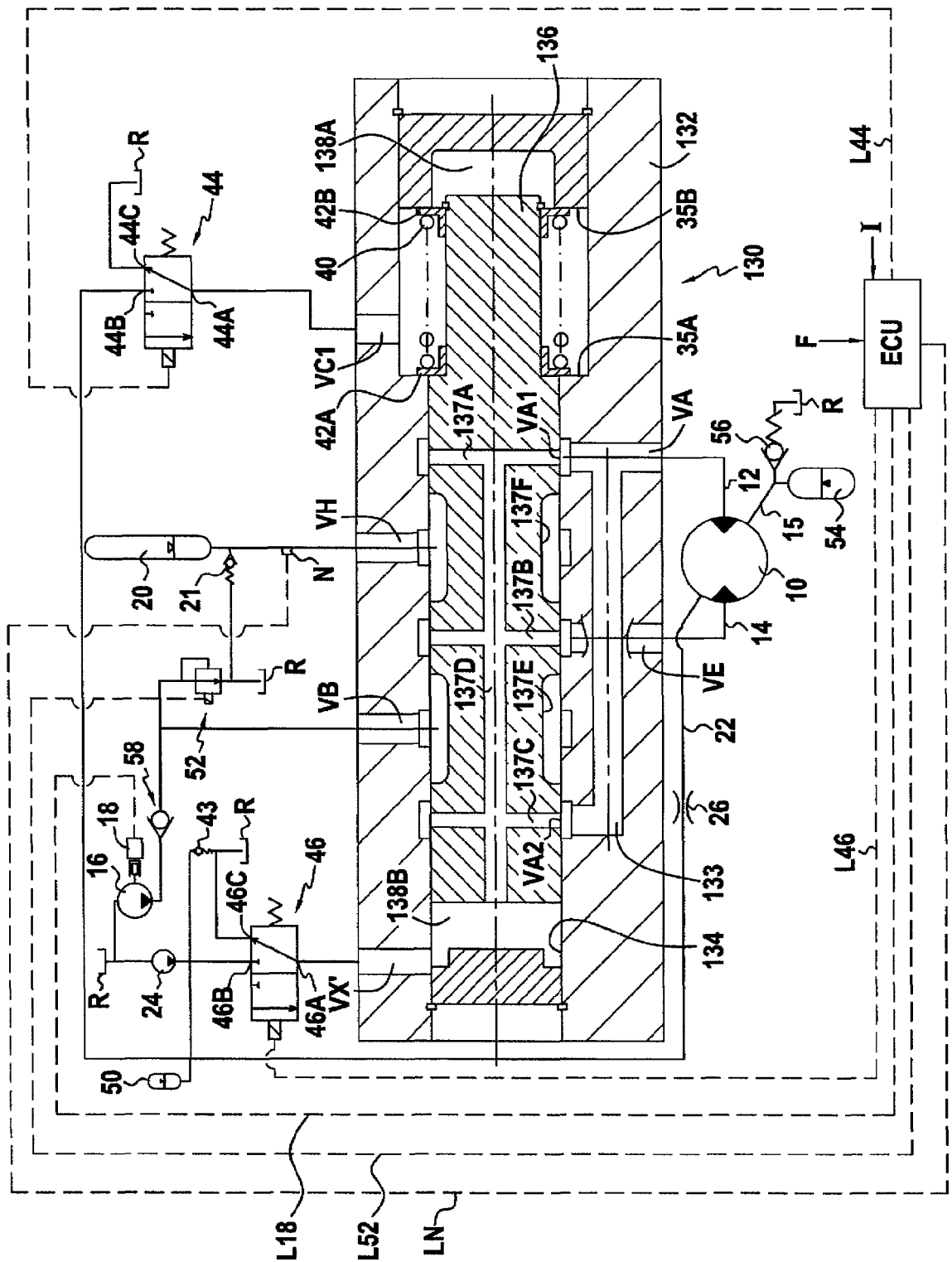
FIG. 2A shows a second embodiment of a circuit, while the slide is in its neutral position and while the motor is declutched.
Figure 2B:
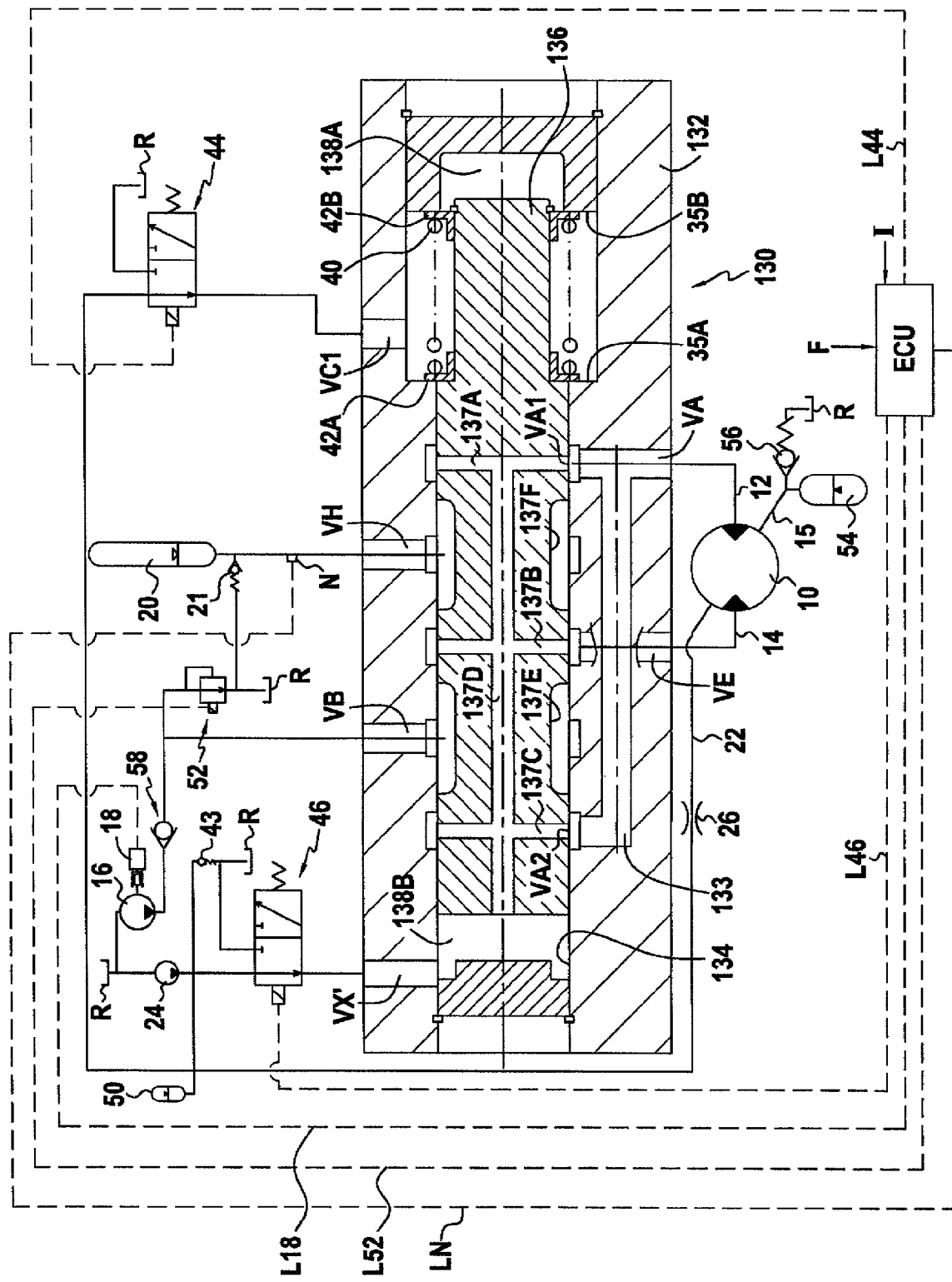
FIGS. 2B, 2C, and 2D show the circuit in situations corresponding respectively to the situations shown in FIGS. 1B, 1C, and 1E.

In FIG. 2A, the slide is in its neutral position and it can be seen that the ports VA and VE communicate with each other and with the port VX', via the holes 137A to 137D in the slide. Insofar as the solenoid valve 46 is then in its neutral position, in which it connects the port VX' to the reservoir R, the main ducts 12 and 14 of the motor 10 are then connected to the reservoir, so that the motor is declutched.

The selection signal making it possible to clutch the motor 10 consists in the first control signals respectively issued into the lines L44 and L46 by the unit ECU for causing the two solenoid valves 44 and 46 to go into their activated positions. In this situation, both of the control chambers 138A and 138B are connected to the outlet of the pump 24, so that the pressures in these two chambers are the same, and so that the slide remains in its neutral position, into which it is continuously urged to return by the spring 40. However, insofar as, in this situation, the auxiliary port VX' that also serves as a control port for feeding the chamber 138B is connected to the outlet of the pump 24, the common pressure in the ducts 12 and 14 of the motor increases, thereby making it possible to clutch the motor. This is the situation shown in FIG. 2B.

In order to go from this situation to the energy recovery situation, the first control signal continues to be issued into the control line L44, so that the first control chamber 138A continues to be fed with fluid, but the control signal ceases to be issued into the line L46 so that the valve 46 returns to its rest position, in which it connects the port VX' and thus the second control chamber 138B to the reservoir R. In this situation, the slide is caused to go into its first end position (leftwards, in this example). In this situation, the feed port VA is connected to the low-pressure port VB, via the groove 137E of the slide 136 that is in register both with the orifice VA2 of the port VA and with the port VB. These ports VA and VB are isolated from the other ports. The port VE is connected to the port VH via the groove 137F of the slide. The holes 137A, 137B and 137C of the slide are closed off by the wall of the bore 134, so that the port VX' is isolated from the other ports.

Figure 2C:
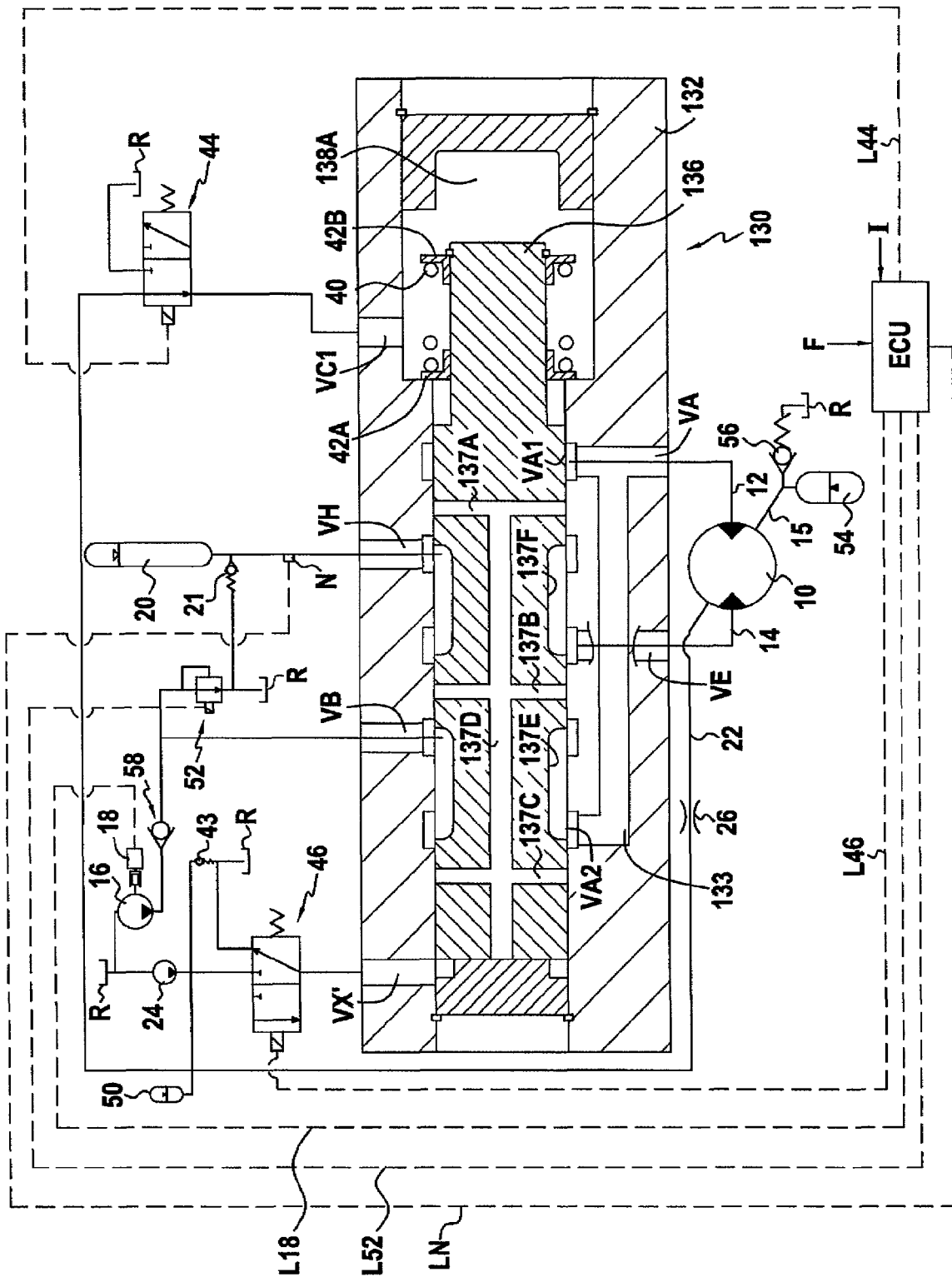

This is the situation that is shown in FIG. 2C. At the end of the energy recovery phase, a balancing phase is performed.

In order to perform the first period of this balancing phase, during which period the motor remains clutched, the unit ECU issues a control signal again into the line L46, thereby activating the solenoid valve 46 and thereby also feeding the chamber 138B from the pump 24, thus putting this chamber at the same pressure as the chamber 138A, which causes the slide 136 to return to its intermediate neutral position, while also keeping the motor in the clutched state. The situation is then the same as in FIG. 2B, except that the fluid level in the accumulator 20 has increased. In order to perform the second period of said balancing phase, the unit ECU ceases to issue control signals into the lines L44 and L46, so that the valves 44 and 46 return to their neutral positions, thus returning to the configuration in FIG. 2A, in which configuration the feed and discharge ducts 12 and 14 are connected to the reservoir, thereby causing the motor to be declutched.

Figure 2D:
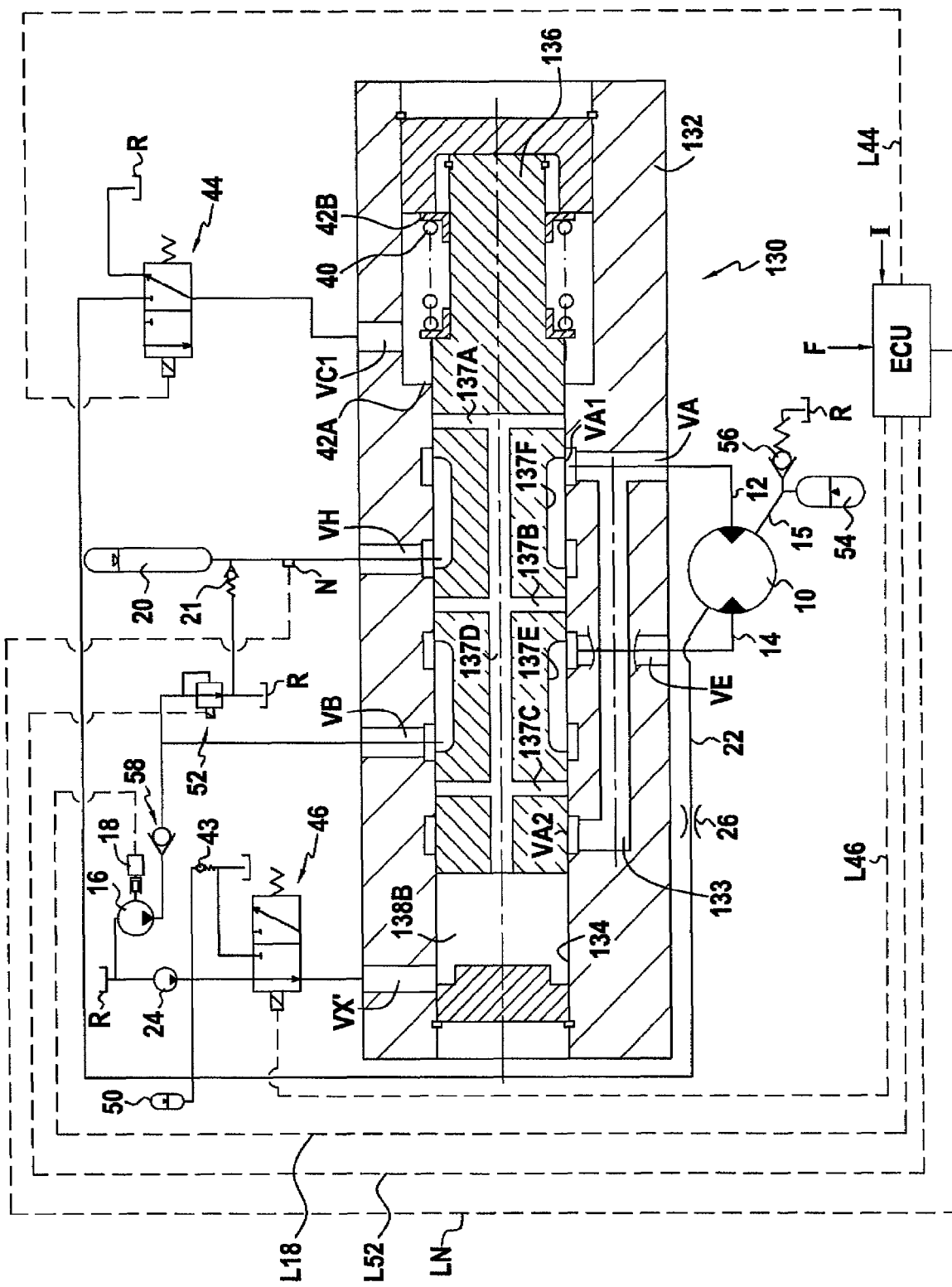

At the end of the balancing phase, the energy delivery phase is performed by putting the circuit in the configuration shown in FIG. 2D. If the energy recovery phase is performed before the end of the first period of the balancing phase, the configuration of FIG. 2D is reached by continuing to issue the control signal into the line L46 so as to maintain the valve 46 in its active position, and the control signal ceases to be issued into the line L44 in order to bring the valve 44 into its rest position. If the energy delivery phase is performed after the end of said first period, i.e. when both of the valves 44 and 46 are in the rest position, the configuration of FIG. 2D is obtained by issuing a control signal into the line L46 for placing the valve 46 in the activated position.

Thus, in the configuration of FIG. 2D, only the control chamber 138B is fed with fluid, via the port VX', so that the slide is moved into its second end position (rightwards, in this example).

When the slide is in this position, the port VA communicates with the port VH via the groove 137F of the slide, which groove is register both with the port VH and the with the first orifice VA1 of the port VA. The second orifice of this port is closed off by the slide. The port VE communicates with the port VB via the groove 137E that is in register with these two ports, while the port VX' is isolated from the other ports by the wall of the bore 134 of the body 132.

With the circuit of FIGS. 2A to 2D, it is thus possible to obtain the same configurations as with the circuit of FIGS. 1A to 1E while omitting the solenoid valve 48, because the motor is caused to be clutched or declutched using the solenoid valve 46.

The electronic control unit ECU is suitable for receiving the information from the various sensors. In particular, the information I that enables it to trigger the energy recovery and energy delivery phases can be based on the measurements of various sensors, relating in particular to levels of braking or of acceleration of the vehicle, for sensing the drive torque delivered by the main propulsion means, on the basis of which measurements and on the basis of calculations and comparisons with recorded data, the unit ECU determines the need to trigger these phases. Data relating to the state of charge of the accumulator 20 is advantageously also taken into account in this determination, in order to avoid, in particular, triggering an energy recovery phase when the charge is at its maximum. The unit ECU includes any memory zone and any computer or comparator means that are suitable for performing its functions. The links between the unit ECU and the various sensors from which it receives the data, and between said unit and the various members that it controls can be wired or wireless links.

The invention claimed is:

1. A hydraulic circuit for recovering energy, which circuit comprises at least one hydraulic motor suitable for being declutched or for being clutched by fluid pressure, two main ducts for feeding fluid to or discharging fluid from said at least one motor, a low-pressure fluid source, a high-pressure accumulator forming a high-pressure source, and valve arrangement suitable for taking up an energy recovery configuration in which said valve arrangement respectively connects the feed main duct to the low-pressure fluid source and connects the discharge main duct to the high-pressure accumulator, and an energy delivery configuration in which said valve arrangement respectively connects the feed main duct to the high-pressure accumulator and connects the discharge main duct to the low-pressure fluid source, the valve arrangement comprising a hydraulic valve comprising firstly a valve body having a feed port connected to the feed main duct, a discharge port connected to the discharge main duct, a low-pressure link port connected to the low-pressure fluid source, a high-pressure link port connected to the high-pressure accumulator, and an auxiliary port, and secondly a slide suitable for taking up, inside the body, a neutral position in which the feed port and the discharge port communicate with each other and with the auxiliary port, an energy recovery position in which the feed port is connected to the low-pressure link port while the discharge port is connected to the high-pressure link port, and an energy delivery position in which the feed port is connected to the high-pressure link port while the discharge port is connected to the low-pressure link port, and the hydraulic circuit further being suitable for causing the slide to move from the neutral position thereof towards the energy recovery position thereof on receiving a first control signal, for causing the slide to move from the neutral position thereof towards the energy delivery position thereof on receiving a second control signal, and for causing the auxiliary port to be connected to a pressure-free enclosure or to a clutch fluid source for clutching the hydraulic motor on receiving a selection signal.

2. A circuit according to claim 1, wherein the neutral position of the slide is intermediate between the energy recovery position and the energy delivery position.

3. A circuit according to claim 1, further comprising at least one resilient return member suitable for urging the slide continuously back towards the neutral position.

4. A circuit according to claim 1, wherein the hydraulic valve has a first control chamber suitable for being fed with fluid via a first control port so as to urge the slide to move towards the energy recovery position, and a second control chamber suitable for being fed with fluid via a second control port so as to urge the slide to move towards the energy delivery position thereof, and the circuit further comprising a solenoid valve arrangement suitable for connecting the two control ports to a pressure-free enclosure in the absence of a control signal, for connecting the first control port to a pilot fluid source on receiving the first control signal, and for connecting the second control port to the pilot fluid source on receiving the second control signal.

5. A circuit according to claim 4, wherein the solenoid valve arrangement comprises a first pilot solenoid valve suitable, in the rest position, for connecting the first control port to the pressure-free enclosure and, in the activated position, for connecting said first port to the pilot fluid source, and a second pilot solenoid valve suitable, in the rest position, for connecting the second control port to the pressure-free enclosure and, in the activated position, for connecting said second port to the pilot fluid source.

6. A circuit according to claim 5, wherein the auxiliary port is one of the control ports.

7. A circuit according to claim 6, wherein the solenoid valve arrangement is suitable for connecting both of the control ports to the pilot fluid source on jointly receiving first and second control signals issued together.

8. A circuit according to claim 5, further comprising a declutching solenoid valve suitable for taking up a declutching position in which said declutching valve connects the auxiliary port to a pressure-free enclosure and a clutching position in which said declutching valve connects the auxiliary port to the clutch fluid source.

9. A circuit according to claim 1, wherein the internal space of the casing of the hydraulic at least one motor is put under pressure.

10. A circuit according to claim 9, wherein the internal space of the casing of the motor is connected to the clutch fluid source via a constriction.

11. A circuit according to claim 9, wherein the internal space of the casing of the motor is connected to a secondary accumulator.

12. A circuit according to claim 1, wherein the low-pressure fluid source comprises a high-flow-rate booster pump suitable for delivering a flow-rate of fluid that is sufficient to feed fluid to said at least one hydraulic motor while said motor is at maximum speed in the energy recovery configuration, and said circuit is such that the high-flow-rate booster pump can be activated or deactivated.

13. A circuit according to claim 12, wherein the high-flow-rate booster pump is equipped with an electromagnetic clutch.

14. A circuit according to claim 13, further comprising an adjustable pressure limiter for causing the pressure to vary in the low-pressure link port.

15. A method of controlling a circuit according claim 1, equipping a vehicle having a propulsion device to which said at least one hydraulic motor is suitable for being mechanically coupled, comprising at least the following control steps:

issuing a first control signal for performing an energy recovery phase during which said at least one hydraulic motor is clutched while the vehicle as driven by the propulsion device is decelerating;

ceasing to issue the first control signal for performing a balancing phase during which the feed and discharge main ducts communicate with each other;

issuing a second control signal for performing an energy delivery phase during which the hydraulic motor is clutched while the vehicle as driven jointly by the propulsion device and by said at least one hydraulic motor is accelerating; and ceasing to issue the second control signal for performing a standby phase during which the feed and discharge main ducts communicate with each other, and during which said at least one hydraulic motor is declutched.

16. A method according to claim 15, wherein the balancing phase includes a first period during which said at least one hydraulic motor remains clutched, and, if it is established that said first period has ended, said first period is followed by a second period during which said at least one hydraulic motor is declutched, and at the end of which said at least one hydraulic motor is clutched again.

17. A method according to claim 15 in which, in order to clutch said at least one hydraulic motor the auxiliary port of the hydraulic valve is connected to the clutch fluid source, the connection between the auxiliary port and the clutch fluid source being maintained during at least one of the energy recovery and energy delivery phases.

18. A hydraulic circuit according to claim 1, wherein the at least one hydraulic motor has pistons and a cam, wherein, when the motor is clutched, the pistons cooperate with the cam to generate a torque and wherein, for declutching the motor, the pistons are moved away from the cam.

* * * * *